(12) United States Patent
Shah et al.

(10) Patent No.: US 6,669,228 B2
(45) Date of Patent: Dec. 30, 2003

(54) AIR BAG COVER OF POLYMERIC FOAM HAVING WEAKENED REGION

(75) Inventors: Suresh D. Shah, Troy, MI (US); Carl Visconti, Clarkston, MI (US); Michael W. Jary, Farmington Hills, MI (US); William J. Filipp, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/178,797

(22) Filed: Jun. 24, 2002

(65) Prior Publication Data

US 2003/0015860 A1 Jan. 23, 2003

Related U.S. Application Data

(60) Provisional application No. 60/302,408, filed on Jul. 2, 2001.

(51) Int. Cl.[7] ............................................... B60R 21/20
(52) U.S. Cl. ...................... 280/728.3; 280/731; 264/51
(58) Field of Search ........................... 280/728.3, 731, 280/732; 264/51, 53

(56) References Cited

U.S. PATENT DOCUMENTS

| | | | |
|---|---|---|---|
| 4,473,665 A | 9/1984 | Martini-Vvedensky et al. .. 521/79 |
| 4,761,256 A | 8/1988 | Hardenbrook et al. ..... 264/45.5 |
| 5,082,310 A | 1/1992 | Bauer ........................ 280/732 |
| 5,158,986 A | 10/1992 | Cha et al. ..................... 521/82 |
| 5,316,335 A | 5/1994 | Gray et al. ............. 280/728.3 |
| 5,443,777 A * | 8/1995 | Mills .......................... 264/255 |
| 5,590,903 A | 1/1997 | Phillion et al. .......... 280/728.3 |
| 5,698,283 A | 12/1997 | Yamasaki et al. ............. 428/43 |
| 6,051,174 A | 4/2000 | Park et al. ..................... 264/50 |
| 6,207,254 B1 | 3/2001 | Lee et al. .................... 428/159 |
| 6,231,942 B1 | 5/2001 | Blizard et al. ............. 428/36.5 |
| 6,254,122 B1 | 7/2001 | Wu et al. ................ 280/730.2 |
| 6,261,490 B1 | 7/2001 | Kliene ........................ 264/45.7 |
| 6,453,535 B1 * | 9/2002 | Nicholas ....................... 29/413 |
| 2002/0130497 A1 * | 9/2002 | Sommer ..................... 280/732 |

OTHER PUBLICATIONS

Copy of PCT International Search Report Feb. 26, 2003.

* cited by examiner

Primary Examiner—Paul N. Dickson
Assistant Examiner—Laura B. Rosenberg
(74) Attorney, Agent, or Firm—Scott A. McBain

(57) ABSTRACT

A cover for an air bag module is provided. The cover comprises a polymeric sheet and one or more thinned portions. The polymeric sheet has a first surface and a second surface and includes a plurality of cells formed therein. A skin is formed on at least the first surface. The thinned portions are formed in the second surface and define a weakened region of the cover.

30 Claims, 5 Drawing Sheets

AIR BAG COVER OF POLYMERIC FOAM HAVING WEAKENED REGION

CROSS REFERENCE TO RELATED APPLICATION

This application claims the benefit of provisional application Ser. No. 60/302,408 filed on Jul. 2, 2001, the contents of which are incorporated by reference herein in their entirety.

TECHNICAL FIELD

This disclosure relates generally to air bags for vehicles. More particularly, this disclosure relates to air bag covers and methods of forming air bag covers having a weakened region defined in a polymeric foam, where the weakened region allows the cover to open during air bag inflation.

BACKGROUND

Air bag modules have become common in modern automobiles. An air bag module comprises an inflatable cushion and an inflator. The module is installed in a desired position within the vehicle. The cushion is stored in a folded position within the air bag module. In response to a threshold event or occurrence, a sensor provides a signal for activating the inflator. The inflator provides a supply of inflating gas to the cushion to inflate the cushion.

The air bag module is provided in a desired location, such as the steering wheel, the dashboard, the seat, the A-pillar, and other locations. A cover is often placed over the air bag module to conceal and protect the contents of the module. The inflation of the cushion applies a force on the cover to tear or open the cover along one or more weakened regions formed in the cover. Thus, the weakened regions allow the cover to open during air bag inflation.

In order to provide an aesthetically pleasing appearance, it is desired to hide the weakened regions from the user. It is also desired that the weakened regions open in a controlled and repeatable manner regardless of the temperature condition and/or deployment level of the air bag module.

It is also desired to provide the weakened region with a thickness that eliminates the difficulties that may arise during the manufacture of the cover. Further, it is also desired to provide the weakened region with a thickness that eliminates the undesired appearance factors that may arise in covers. For example, during conventional injection molding of prior covers the weakened region has been formed as a thinned section of the cover. This thinned section can cause a restriction in the flow of the polymer material through the mold at the weakened region. This flow restriction creates a zone of high shear stress in the weakened region. The high shear stress zone may affect, for example, the finished surface of the region. Namely, the elastic nature of the polymer may cause the stress in the region to rebound once the cover has been released from the molding tool, which can cause a bump on the surface of the cover. Additionally, the combination of the thin/thick sections caused by the weakened region also creates non-uniform shrinkage/expansion of the cover along the weakened region during the temperature cycling to which the vehicle is exposed. The non-uniform shrinkage along this weakened region may show up as a bump or ridge on the surface facing the vehicle or show surface, thus providing a potentially displeasing aesthetic appearance.

One prior solution to the problems of restricted polymer flow through the mold and the non-uniform shrinkage/expansion of the cover along the weakened region is to increase the thickness of the thinned portion. However, increasing the thickness requires additional materials and cost.

Accordingly, continuing developments in the design and manufacture of air bag covers are desired to provide covers that meet the desired aesthetic properties and functional requirements.

SUMMARY

A cover for an air bag module is provided. The cover comprises a polymeric sheet and one or more thinned portions. The polymeric sheet has a first surface and a second surface and includes a plurality of cells formed therein. A skin is formed on at least the first surface. The thinned portions are formed in the second surface and define a weakened region of the cover.

A cover for an air bag module comprising a foamed polymeric sheet and a weakened region is provided. The foamed polymeric sheet has a show surface, a non-show surface, and a skin formed on at least the show surface. The weakened region is formed by one or more thinned portions defined in the non-show surface.

An air bag module is provided having a housing, an inflatable cushion, an inflator, and a cover comprising a foamed polymeric member. The housing is positionable in a cavity of a vehicle. The inflatable cushion and inflator are stored in the housing such that the inflator is in fluid communication with the inflatable cushion. The foamed polymeric member has a show surface, a non-show surface, and a weakened region. The weakened region is defined by one or more thinned portions. The non-show surface covers the housing proximate the inflatable cushion whereby inflation of the inflatable cushion by the inflator causes the inflatable cushion to expand into the cover, and thus to apply a force on the cover to tear or open the cover along the weakened region thereby providing an outlet for the inflatable cushion through the cover into the vehicle.

A method of making a cover for an air bag module is provided. The method comprises mixing a blowing agent and a molten polymer under a first condition, the first condition being sufficient to prevent the blowing agent from forming bubbles in the polymer; changing the first condition to a second condition, the second condition being sufficient to cause the blowing agent to form bubbles in the molten polymer; and molding the molten polymer containing the bubbles into a desired shape in a mold, the desired shape comprising a first polymer sheet having a plurality of first cells being defined therein and a thinned portion being defined in a first surface of the first polymer sheet.

A method of controlling the density of a region of a foamed polymer is also provided. The method comprises mixing a blowing agent and a molten polymer under a first condition, the first condition being sufficient to prevent the blowing agent from forming bubbles in the polymer; changing the first condition to a second condition, the second condition being sufficient to cause the blowing agent to form bubbles in the molten polymer; molding the molten polymer containing the bubbles into a desired shape in a mold, the desired shape including a plurality of first cells being defined within the desired shape by the bubbles; and moving a portion of the mold disposed at the region from a first position to a second position, movement of the portion of the mold causing the first cells in the region to change to second cells without changing the first cells in remaining regions of the foamed polymer, the foamed polymer having a first density at the remaining regions caused by the first cells and a second density at the region caused by the second cells.

The above-described and other features are appreciated and understood by those skilled in the art from the following detailed description, drawings, and appended claims.

BRIEF DESCRIPTION OF THE DRAWINGS

Referring now to the Figures, where like elements are numbered alike.

DESCRIPTION OF THE PREFERRED EMBODIMENT

Figure 1:
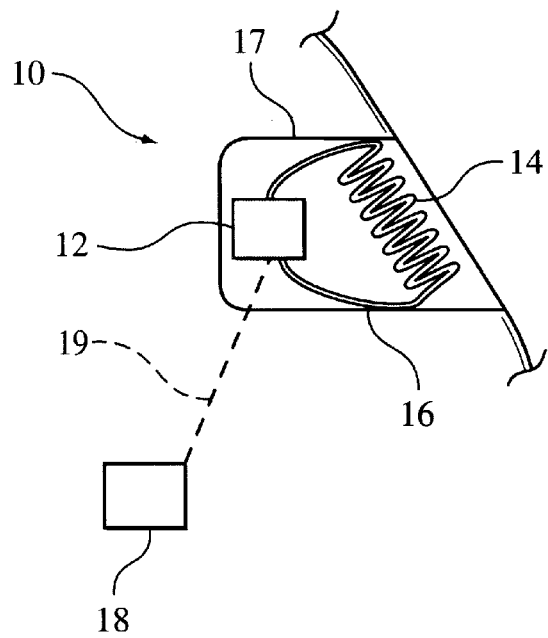
FIG. 1 is a schematic depiction of an air bag module.
Figure 2:
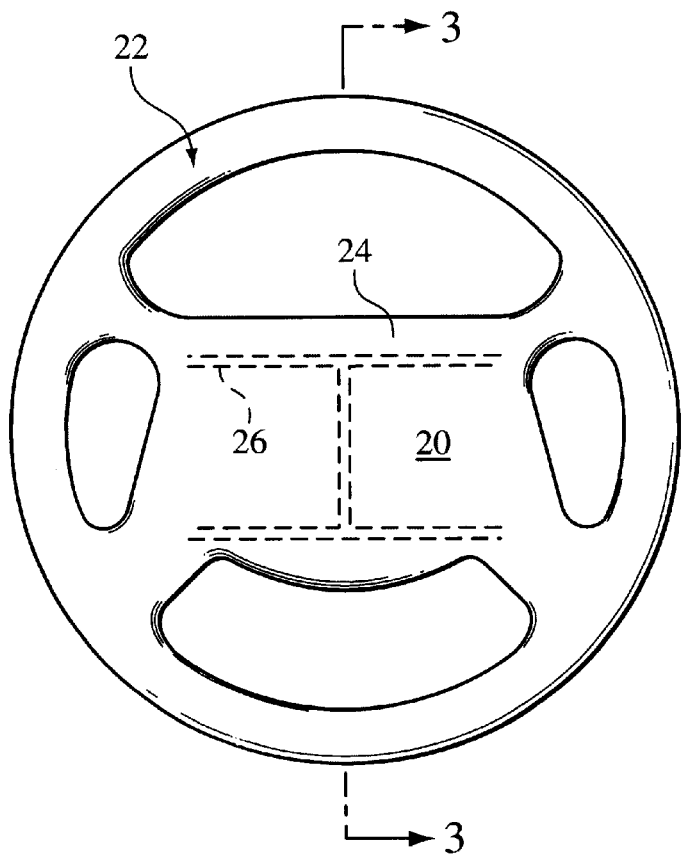
FIG. 2 is a front view of a steering wheel.
Figure 3:
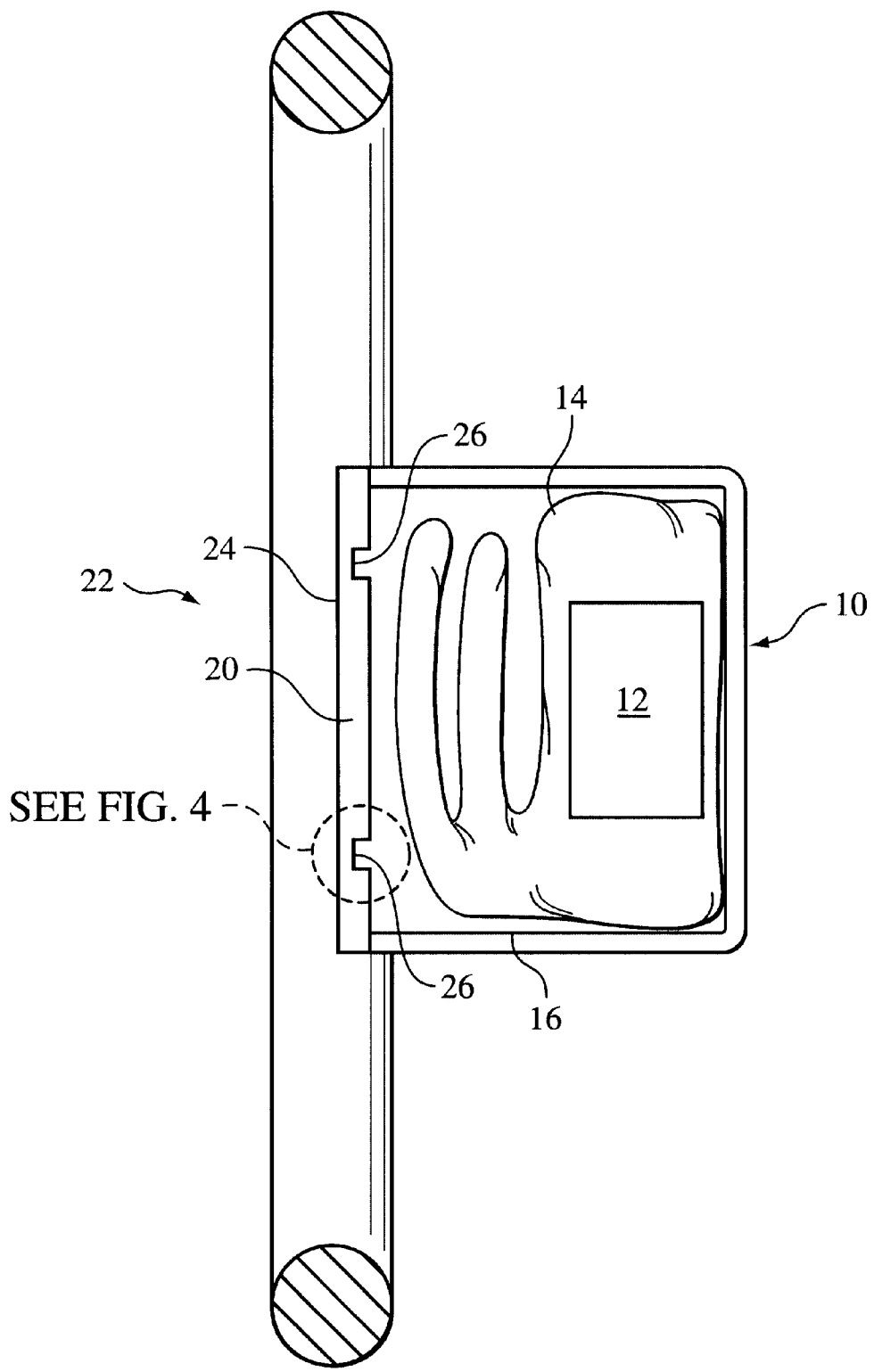
FIG. 3 is a sectional view of FIG. 2 along lines 3—3.

Referring to the Figures and particularly to FIGS. 1–3, an air bag module 10 is illustrated. The module 10 includes an inflator 12 and an inflatable cushion 14 stored in a housing 16. The housing 16 is positionable in a cavity 17 defined in a vehicle (not shown). In an exemplary embodiment, the cavity 17 is defined in a steering wheel 22 of the vehicle. The cushion 14 is stored in a folded position in the housing 16 and/or the cavity 17, and is in fluid communication with the inflator 12. A cover 20 is placed over the housing 16 and/or the cavity 17 to protect and conceal the module 10.

A sensor or sensing-and-diagnostic module 18 is adapted to detect an activation event to provide an activation signal 19 to the inflator 14. Upon detection of an activation event by the sensor 18, the inflator 12 is activated via signal 19 such that the cushion 14 inflates and expands into the cover 20. The force applied by the expanding cushion 14 on the cover 20 opens the cover along one or more weakened regions 26 to allow the cushion to expand into the vehicle's interior.

For purposes of clarity, cavity 17 is described herein as being defined within a steering wheel 22. However, it should be recognized that the cavity 17 and the air bag module 10 are described herein by way of example only as being used in conjunction with the steering wheel 22. Of course, air bag modules and/or cavities in other regions of the vehicle are contemplated.

The steering wheel 22 illustrated in FIGS. 2 and 3, includes a central hub 24 having the module 10 secured therein. The cover 20 is placed over the hub 24 to protect and conceal the module 10. In addition, the cover 20 can be used with other known steering wheel devices, such as membrane horn switches, emblems, and the like.

The module 10 is illustrated by way of example only as being integral with the central hub 24. Of course, it is contemplated for the module 10 to be mounted on the steering wheel 22 separate from the hub 24 or in any other known construction.

The cover 20 can be of one-piece construction as illustrated, or can include multiple pieces and/or layers, which are assembled to form the cover. For example, the cover can be a single layer (e.g., a single shot cover) or can comprise multiple layers (e.g., a multiple shot cover), where the multiple layers may have the same or different compositions.

The cover 20 includes one or more weakened regions 26. The inflation of the cushion 14 by the inflator 12 causes the cushion to expand into the cover 20, and thus to apply a force on the cover. The weakened regions 26 are configured to tear or open when the force applied by the cushion 14 on the cover 20 exceeds a predetermined limit. The opening of the cover 20 along the weakened regions 26 provides an outlet for the cushion 14 through the cover, which allows the cushion to expand into the vehicle interior.

In a first exemplary embodiment, the weakened regions 26 are arranged in one or more lines, such as the generally H-shaped geometric arrangement illustrated in FIG. 2. It also should be recognized that the generally H-shaped geometric arrangement of the weakened regions 26 is only one potential arrangement. It is to be understood that any number of other geometric arrangements for the weakened regions are contemplated. For example, the weakened region can be arranged in different shapes such as, but not limited to I-shaped, Y-shaped, U-shaped, and others. The shape of the weakened region can be selected depending on the part design and deployment criteria. Regardless of the configuration of the weakened regions 26, the cover 20 is opened along the weakened regions by a force above a predetermined limit applied to the cover by the expanding cushion 14.

Figure 4:
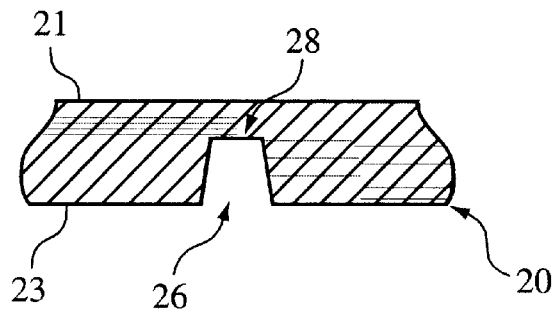
FIG. 4 is a sectional view of the weakened region of FIG. 3 along circle 4—4.

Referring now to FIG. 4, a sectional view of the weakened region 26 is shown. The weakened region 26 comprises a thinned portion 28 defined in the cover 20. The thinned portion 28 is, for example, a continuous thinned portion and/or a plurality of spaced apart-thinned portions that enable the cushion 14 to tear or open the cover 20 at the weakened region 26. It should be recognized that the thinned portion 28 is illustrated by way of example only as having a substantially rectangular cross section. Of course, other cross sections are contemplated such as, but not limited to, arcuate-shaped, V-shaped, and others. It is also contemplated for the cross section to change in cross sectional shape and/or size along the length of the thinned portion 28. Alternately and in the example where the thinned portion 28 is a plurality of spaced apart-thinned portions, it is contemplated for the cross section and/or length of the thinned portion 28 in the plurality of thinned portion 28 to vary.

A continuous surface is presented on the outside surface 21 (e.g., the vehicle facing or show surface) of the cover 20, while the thinned portion 28 is provided on the inside surface 23 (e.g., non-vehicle facing or non-show surface) of the cover. Thus, the cover 20 provides a weakened region 26 that is substantially hidden from the vehicle interior, and thus provides an aesthetically pleasing appearance. Of course, the thinned portion 28 can be provided on the outside surface surface 21 (e.g., show surface) of the cover 20 to take advantage of the opening consistency and other advantages of the cover described in detail below.

The predetermined limit of force necessary to open the weakened region 26 must take into account several different conditions to which the module 10 is exposed. By way of example, and as described in detail below, the module 10 is often configured to deploy the cushion 20 at one or more levels, and the vehicle in which the module is installed is often exposed to very large ambient temperature ranges.

For example, the module 10 is often configured to deploy the cushion 14 at one or more deployment levels depending on the level of the activation event detected by the sensor 18. The deployment levels desired for the cushion 14 affect the design of the weakened region 26. The module 10 is configured to deploy the cushion 14 at variable levels by for example, varying how rapidly inflator 12 activates after detection of the activation event, or by venting, at least a portion of the inflation gases generated by the inflator during activation, away from the cushion 20. Alternately, the inflator 12 is often configured to deploy at two or more levels (e.g., a dual stage inflator) by varying the amount of inflation gas supplied to the cushion 14. Here, each level generates a different quantity of inflation gas, which in turn generates a different pressure within the cushion 20. All of these methods of varying the deployment level of the cushion 14 change the pressure available within the cushion to act on the cover 20.

Thus, a deployment of the cushion 14 at a low level applies a first force to the cover 20, while a deployment at a high level applies a second, higher force to the cover. As discussed above, the weakened region 26 is configured to open when the force applied to the cover 20 exceeds a predetermined limit. In order to ensure opening of the weakened region 26 during both the high and low level deployments, the cover 20 is designed such that the weakened region opens when the force generated during low level deployments (e.g., the first force) is above the predetermined limit. This ensures deployment of the cushion 14 during low-level actuation events.

Additionally, vehicles are typically subjected to very large temperature variations, and such variations are known to affect performance of the weakened region 26. For example, in southern regions of the United States ambient temperatures of 100° F. (degrees Fahrenheit) are often experienced (with more than about 200° F. possible in the car), while in northern regions of the United States ambient temperatures of 0° F. are often experienced. Testing of vehicles usually includes testing at a range of temperatures, such as from about 185° F. to about −40° F.

The cover 20 is formed of polymeric materials such as polyolefin elastomers (e.g., polypropylene), co-polyester elastomers, and styrene-based elastomers, which are preferably injection molded to form the cover. These polymer materials can experience a change in material properties with temperature. More specifically, these materials weaken as the temperature increases towards the material's glass transition temperature and/or melting temperature, or alternatively, these materials strengthen or harden as the temperature decreases away from the material's glass transition temperature and/or melting temperature.

As discussed above, the weakened region 26 is configured to open when the force applied to the cover 20 exceeds a predetermined limit. For opening at any temperature, the cover 20 is designed such that the predetermined limit of force necessary to open the weakened region 26 under lower temperature conditions is below the lowest deployment force that may be generated by the cushion 14 during inflation.

Accordingly and as provided by example above, the weakened region 26 is exposed to various deployment levels, temperature ranges and other conditions. Thus and in order to provide consistent operation of module 10 at any temperature, the weakened region 26 is configured to open at the lower end of the temperature range with the lowest deployment forces generated by the cushion 14. By way of example, this typically results in polypropylene covers 20 having a thickness of about 0.020 inches at the thinned portion 28, while the rest of the cover has a thickness of about 0.120 inches or higher.

However, it has been found that providing the thinned portion 28 with a thickness designed to consistently open at low temperatures with a low deployment forces may affect the manufacture of the cover 20.

For example, during conventional injection molding of a solid cover 20 the thinned portion 28 causes a restriction in the flow of the polymeric material through the mold at the thinned portion. This flow restriction can create a zone of high shear stress in the weakened region 26. The zone of high shear stress may affect the weakened region 26 due to orientation, crystallization, shrinkage, and other material characteristics or properties of the thinned portion as compared to those of the rest of the cover. These inconsistencies can be found both within the same part and/or on a part-to-part basis. Thus, conventional injection molding of the solid cover 20 may not provide the weakened region 26 with the desired predictability and consistency.

Additionally, the combination of the thin/thick sections (e.g. thinned portion 28 and cover 20) also creates non-uniform shrinkage/expansion of the cover 20 along the weakened region 26 during the temperature cycling to which the vehicle is exposed. The non-uniform shrinkage along the weakened region 26 shows usually up as a bump or ridge on the show surface, thus providing a potentially displeasing aesthetic appearance. Additionally, the elastic nature of the polymer may cause the stress in the weakened region to rebound or spring-back once the cover has been released from the molding tool, which can cause a bump on the surface of the cover. This effect can limit the processing conditions for making the cover and can limit flexibility in the design of the cover. Thus, conventional injection molded covers 20 may also not provide the desired appearance factors over long-term use.

One solution to the problems of restricted polymer flow through the mold and the non-uniform shrinkage/expansion of the cover along the weakened region is to increase the thickness of the thinned portion 28 at the weakened region 26. However, increasing the thickness increases material usage and cost of the cover.

It has been determined that including foamed or cellular polymer materials in the cover, at least along the weakened region, provides for predictable and consistent performance, eliminates shrinkage along the weakened region, and reduces material usage. Various exemplary embodiments of such foamed or cellular polymer covers are illustrated in FIGS. 5–11.

It has also been determined that a cellular weakened region provides consistent opening forces regardless of temperature, excellent surface appearance, excellent low temperature deployment properties, and reduced material usage.

It has also been determined that the process and/or agents used to make the foamed or cellular polymer materials of the cover enable the tear seam and cover to made thinner, which also provides the desired weaker section required for the deployment.

The manufacture of the cover from a foamed or cellular polymer, at least along the weakened region, can provide for the desired predictable and consistent performance under various forces and temperature ranges, while also eliminating shrinkage along the weakened region, and reduces material usage. More specifically, it has been determined that a foamed or cellular weakened region provides consistent performance regardless of temperature. The foamed or cellular weakened region also provides excellent surface appearance, excellent low temperature deployment properties, and reduced material usage.

The foamed or cellular weakened region is a polymeric material that includes a plurality of hollows, also called cells, in the polymeric matrix. By replacing solid polymers with a foamed polymeric matrix, less raw materials are necessary for parts of a given volume. Thus, by using polymeric foams in many applications instead of solid polymers, material costs and material usage are reduced.

Figure 5:
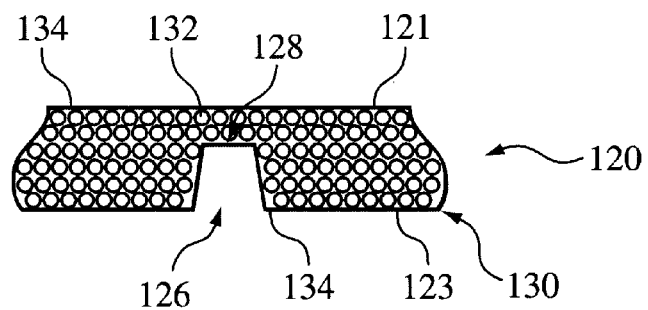
FIG. 5 is a sectional view of an exemplary embodiment of a cover having a weakened region.

Referring now to FIG. 5, a foamed polymeric cover 120 comprising a polymeric sheet 130 with a weakened region 126 defined therein is illustrated. The polymeric sheet 130 comprises a plurality of cells or hollows 132. In an exemplary embodiment, the cells 132 are micro cells having a dimension of less than about 100 microns. Of course, cells having a dimension larger or smaller than 100 microns are contemplated.

The weakened region 126 comprises one or more thinned portions 128 formed in an inside surface 123 (e.g., non-show surface) of the sheet 130. Alternately, it is contemplated for the thinned portions 128 to be formed in the outside surface 121 (e.g., the show surface) of the sheet 130 or a combination of the inside and outside surfaces, as needed.

The foamed polymeric cover 120 is formed of, for example, polyolefin elastomers (e.g., polypropylene), co-polyester elastomers, and styrene-based elastomers or other materials suitable for incorporation of the cells 132.

By way of comparative example, the foamed polymeric cover 120 is described as having the same dimensions as the solid cover 20 discussed above with respect to FIG. 4. Specifically, the cover 120 has a thickness of about 0.020 inches at the thinned portion 128, while the rest of the cover has a thickness of about 0.120 inches. The cells 132 of the foamed polymeric cover 120 result in a reduction of the density of the weakened region 126 of about 10% as compared to the solid polymeric cover 20. The decreased density afforded by the cells 132 also weakens or reduces the force necessary to open the weakened region 126. Because of the inclusion of the cells 132 in the cover 120, the opening force of the thinned portion 128 having the cells is lower than the opening force for a similarly sized thinned portion 28 of a solid cover.

When a solid cover 20 and a foamed polymeric cover 120 made of the same polymeric material and having identical dimensions of their respective thinned portions (28 and 128) are compared to one another, the weakened region 126 in the foamed polymeric cover typically has a lower opening force than the weakened region 26 of the solid cover 20. Thus, for equal thicknesses the foamed polymeric cover 120 has a lower opening force at the desired range inflation pressures and in vehicle temperatures.

It has also been found that for equal thicknesses, the foamed polymeric cover 120 has a more consistent opening force than the solid cover 20 at the desired range inflation pressures and in vehicle temperatures. As will be described in detail below, a blowing agent can be used in the manufacture of the foamed polymeric cover. This blowing agent can cause a decrease in the viscosity of the molten polymer. This decrease in viscosity mitigates the restriction in the flow of the polymer material through the mold at the weakened region. By mitigating the flow restriction, the zone of high shear stress in the weakened region is mitigated. By reducing and/or eliminating the zone of high shear stress in the weakened region, the required opening force of the foamed polymeric cover 120 is more predictable and consistent.

Alternately, the opening force required can be varied by varying the thickness of the foamed polymer. Thus, the thickness of the thinned portion 128 can be increased while maintaining an opening force equivalent to the thinned portion in a solid cover. Again, the cells 132 of the sheet 130 result in a reduction of the density of the cover 120 at the weakened region 126 of about 10% as compared to that of the solid polymeric cover 20. This reduction in density also reduces the force necessary to open the weakened region 126. Consequently, the thickness of the thinned portion 128 can be increased while maintaining a required opening force equivalent to that of the thinned portion 28 of a solid cover 20. When a solid cover 20 and a foamed polymeric cover 120 made of the same polymeric material and having identical opening force limits of their respective thinned portions (28 and 128) are compared to one another, the foamed polymeric cover typically has a weakened region 126 that is thicker than the weakened region 26 of the solid cover 20.

For example, the solid cover 20 discussed above with respect to FIG. 4, has a thickness at the thinned portion 28 of about 0.020 inches and at remaining portions of the cover 20 of about 0.120 inches. In order to provide the foamed polymeric cover 120 with a weakened region 126 with the same required opening force as the solid cover 20, the thinned portion 128 has a thickness of about 0.025 inches and the cover 120 has a thickness of about 0.120 inches. In this example, an increase of the thickness of the thinned portion 128 (with cells 132) over the thinned portion 28 (without cells 132) of about 20% to 50% is achieved.

Increasing the thickness of the weakened portion 126 further increases the polymer flow through the mold at the weakened region, during injection molding of the cover. This can further reduce the high shear stress zone at the thinned portion 128. Again, by reducing and/or eliminating the zone of high shear stress in the weakened region, the opening force required for the foamed polymeric cover 120 is more predictable and consistent than the opening force of covers that have such stress zones (e.g., solid covers).

Additionally, increasing the thickness of the weakened region 126 can mitigate the non-uniform shrinkage/expansion of the cover that can occur along the weakened region during the temperature cycling to which the vehicle is exposed. This improves the aesthetic aspects of the foamed polymeric cover 120. As an additional benefit, the density reduction, which the cells 132 provide to the cover 120, allows the use less raw materials than the similarly sized solid cover 20. Thus, foamed cover 120 can be lighter than a solid cover of equal volume.

Several methods can be utilized to produce polymeric foams. For example, polymeric foams have been formed through with a polymer matrix having of physical blowing agents, chemical blowing agents, super critical fluids, combinations of any of the foregoing and others.

By way of example only, the cover 120 can be produced by admixing a blowing agent with a melted polymer to form a substantially homogeneous mixture of the blowing agent in the melt. The blowing agent can be introduced into molten polymer in a molding machine, can be introduced with the resin in the hopper of the molding machine, can be incorporated as part of the resin, and combinations of any of the foregoing.

The agent can be an inert agent, such as $CO_2$, $N_2$, or other inert gas. The agent and the melt are mixed at first conditions (usually high pressures) so that the agent mixes with melt. In some instances, the blowing agent can be a supercritical fluid that is solublized in the polymer melt at the first conditions (e.g., high pressure and temperature) in order to create a substantially homogeneous single-phase solution.

The first conditions are maintained until the formation of the cells is desired. The cells can be accomplished by changing the first conditions to second conditions (usually ambient pressures). The change from the first to the second conditions causes the agent to expand, forming bubbles in the melt. This change in conditions (from the first to the second) can be a change in temperature, a change in pressure, or combinations thereof.

The melt is injected into a mold while at the second conditions or while the conditions are being changed to the second conditions. The mold is cooled to return the melt to a solid state, which forms the cover. The bubbles formed by the agent in the melt result in the cells or hollows being formed in the cover. It is known to form foamed polymers having cells of less than about 100 microns in diameter. These polymers are known as micro cellular materials.

As the mold is cooled, the heat removed from the portion of the melt in contact with the mold causes the agent in that portion to contract such that a skin is formed on the surface of the finished part. The skin is substantially free of the cells or hollows. The thickness of the skin is dependent upon how rapidly the heat is removed from the surfaces of the melt that are in contact with the mold. During normal molding cycle times and temperatures, the skin is formed having a minimum thickness of about 0.0002 inches. However, the thickness of the skin can be increased by removing the heat from the melt more rapidly. Alternately, the thickness of the skin can be decreased by slowing the removal of heat from the melt.

It should be recognized that the process for forming foamed polymers is described above by way of example only. Other methods of forming a foamed polymer are contemplated to be within the scope of the present disclosure. Accordingly, any method for forming the cells in the cover can be used so long as the cover is provided with the desired cells.

In an exemplary embodiment, the polymeric sheet 130 comprises a skin 134 of a desired thickness formed on its outside surface 121 (e.g., the show surface). The polymer sheet 130 may also comprise the skin 134 formed the inside surface 123 (e.g., the non-show surface). The skin 134 is a unitary part of the cover that is formed during the molding of the cover 120. Namely, the skin 134 is preferably formed by removing heat from the portion of the sheet 130 in contact with the mold to cause the blowing agent in that portion of the sheet to contract such that substantially no cells are formed on the surface of the cover. Thus, in this embodiment the sheet 130 comprises the skin 134 and the cells 132 all formed from the same polymeric material as a unitary element.

Figure 6:
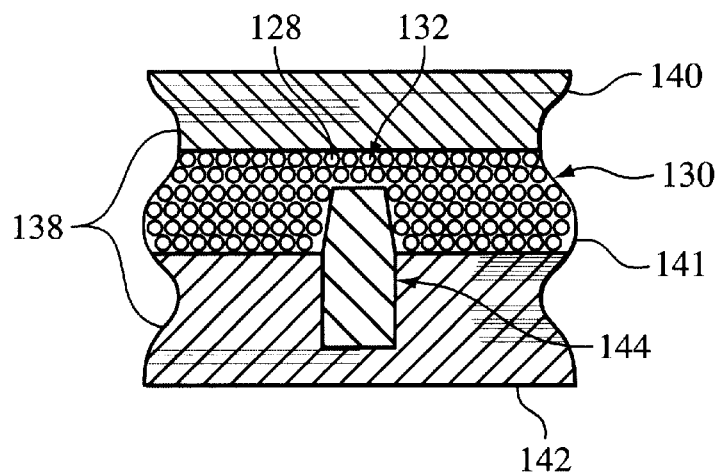
FIG. 6 is schematic view of an exemplary embodiment of a manufacturing process for making the cover of FIG. 5.

Referring now to FIG. 6, an exemplary manufacturing process for making the foamed polymeric cover 120 of FIG. 5 is provided. The cover 120 is preferably formed by injection molding molten polymeric material into a mold 138. The mold 138 comprises a first portion 140 and a second portion 142 defining a cavity 141 therebetween. The cavity 141 defines the shape of the cover 120. Here, the first portion 140 forms the outside or show side of the cover 120, and the second portion 142 forms the inside or non-show side of the cover.

The second portion 142 is configured to provide the foamed polymeric cover 120 with the weakened region 126 (e.g., thinned portion 128). More specifically, the second portion 142 comprises a blade 144 to form the thinned portion 128. As discussed above, during manufacture, a blowing agent is admixed with the polymer. The mixture is injected into the mold 138, either while being subjected to a change in conditions (e.g., first conditions to the second conditions) or after being subjected to the change in conditions, such that the cells 132 are formed in the polymer. The blade 144 reduces the distance between the first and second portions (140 and 142) of the mold 138 to form the thinned portions 128.

It has also been found that the addition of the blowing agent in the molten polymer causes a decrease in the viscosity of the polymer. This decrease in viscosity mitigates the restriction in the flow of the polymer material through the mold at the weakened region. Accordingly, the blowing agent allows the distance between the first and second portions (140 and 142) of the mold 138 to be minimized and/or allows the zone of high shear stress in the weakened region to be minimized.

In an alternate embodiment, the first and second portions of the mold (140 and 142) and the blade 144 are configured to provide the cover 120 with the skin 134. Here, the first and second portions (140 and 142) and the blade 144 remove heat from the portion of the sheet 130 in contact with the mold 138. As discussed above, removing heat from the portion of the sheet 130 in contact with the mold 138 causes the blowing agent in that portion to contract such that substantially no cells are formed on the surface of the cover. In this embodiment, the mold 138 is cooled to form the skin 134 after the molten stream is injected into the mold.

The first portion 140 is also configured to provide the skin 134 with the desired texture and/or surface features. Namely, the skin 134 provides an aesthetically desirable outside surface 121 (e.g., the vehicle facing or show surface) to the cover 120.

Figure 7:
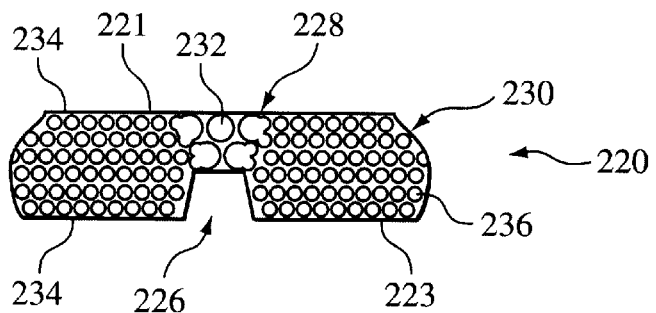
FIG. 7 is a sectional view of an alternate exemplary embodiment of a cover having a weakened region.

Referring now to FIG. 7, an alternate exemplary embodiment of a foamed polymeric cover 220 comprising a polymeric sheet 230 with a weakened region 226 is illustrated. The polymeric sheet 230 comprises a first plurality of cells or hollows 232 and a second plurality of cells or hollows 236. The weakened region 226 comprises one or more thinned portions 228 formed in an inside surface 223 (e.g., non-show surface) of the sheet 230. The first cells 232 are disposed in the sheet 230 at the weakened region 226, while the second cells 236 are disposed in the sheet in the remaining regions of the cover. Advantageously, the first cells 232 in the weakened region 226 are larger than the second cells 236 in the remaining portions of the cover. Thus, the first cells make the cover 220 in the weakened region 226 less dense than the remaining portions of the cover.

As illustrated in FIG. 7, the thickness of the thinned portion 228 can be increased without increasing the required opening force (as compared to solid covers) of the weakened region 226. Again, the first cells 232 result in a reduction of the density of the cover 220 at the weakened region 226 of about 15% to about 30% as compared to the solid polymeric cover 20. Further, the second cells 236 result in a reduction of the density of the cover 220 at the remaining regions of at least about 2% as compared to the solid polymeric cover 20, with up to about 15% contemplated.

This reduction in density also reduces the force necessary to open the weakened region 226. Because of the inclusion of the cells 232 in the cover 220, the thickness of the thinned portion 228 can be increased without increasing the force necessary to open the weakened region 226. Thus, when a solid cover 20 and a foamed polymeric cover 220 made of the same polymeric material and having identical opening force limits of their respective thinned portions (28 and 228) are compared to one another, the foamed polymeric cover has a weakened region 226 that is typically thicker than the weakened region 26 of the solid cover 20.

For example, the solid polypropylene cover 20 discussed above with respect to FIG. 4, has thinned portion 28 of about 0.020 inches and cover 20 of about 0.120 inches. In order to provide the foamed polymeric cover 220 with a weakened region 226 with the same opening force as the solid cover 20, the thinned portion 228 has a thickness of about 0.030 inches and the cover 220 has a thickness of about 0.120 inches. In this example, an increase of the thickness of the thinned portion 228 (with cells 232) over thinned portion 28 (without cells 232) of about 30% to 55% is achieved.

Alternately, the foamed polymeric cover 220 can be provided with the same dimensions as the solid cover 20 discussed above with respect to FIG. 4. Specifically, the cover 220 can have a thickness of about 0.020 inches at the thinned portion 228, while the rest of the cover has a thickness of about 0.120 inches or higher (not shown). Here, the first cells 232 result in a reduction of the density of weakened region 226 of about 15% to 30% as compared to a solid cover. However, the second cells 236 in the remaining portions of the cover 220 result in a reduction of the density of cover 220 of between 2%–15% as compared to a solid cover.

The decreased density afforded by the cells 232 also reduces the force necessary to open the weakened region 226. Because of the inclusion of the cells 232 in the cover 220, the opening force of the thinned portion 228 having the cells is lower than the opening force for a similarly sized thinned portion 28 of a solid cover. Thus, when a solid cover 20 and a foamed polymeric cover 220 made of the same polymeric material and having identical dimensions of their respective thinned portions (e.g., 0.020 inches) are compared to one another, the foamed polymeric cover has a weakened region 226 with a lower opening force than the weakened region 26 of the solid cover 20.

Accordingly, cover 220 provides for weakened region 226 having a lower opening force than similar sized weakened regions without cells and requires less raw materials than similarly sized solid covers. Alternately, the cells 232 allow the thickness of the thinned portion 228 to be increased (as compared to a weakened region without cells) without an increase in the opening force.

Increasing the thickness of the weakened region 226 increases polymer flow through the mold at the weakened region. Increasing the thickness of the weakened region 226 can reduce the high shear stress zone at the thinned region 228. This provides the foamed polymeric cover 220 with a weakened region 226 that opens in a predictable and consistent manner. Additionally, increasing the thickness of the weakened region 226 mitigates the non-uniform shrinkage/expansion of the cover that can occur along the weakened region during the temperature cycling to which the vehicle is exposed, which improves the aesthetic aspects of the foamed polymeric cover 220. As an additional benefit, the density reduction the cells 232 and cells 236 provide to the cover 220 allows the use less raw materials than the similarly sized solid cover 20.

In an alternate embodiment, the polymeric sheet 230 comprises a skin 234 formed on its outside surface 221 (e.g., the show surface). Alternately, the polymer sheet 230 may further comprise the skin 234 formed on both the outside surface 221 (e.g., the show surface) and the inside surface 223 (e.g., the non-show surface). The skin 234 is preferably formed during the molding of the cover 220. Namely, the skin 234 is preferably formed by removing heat from the portion of the sheet 230 in contact with the mold to cause the blowing agent in that portion of the sheet to contract such that substantially no cells are formed on the surface of the cover. Thus, in this embodiment the sheet 230 comprises the skin and the cells 232 all formed from the same polymeric material as a unitary element.

Figure 8:
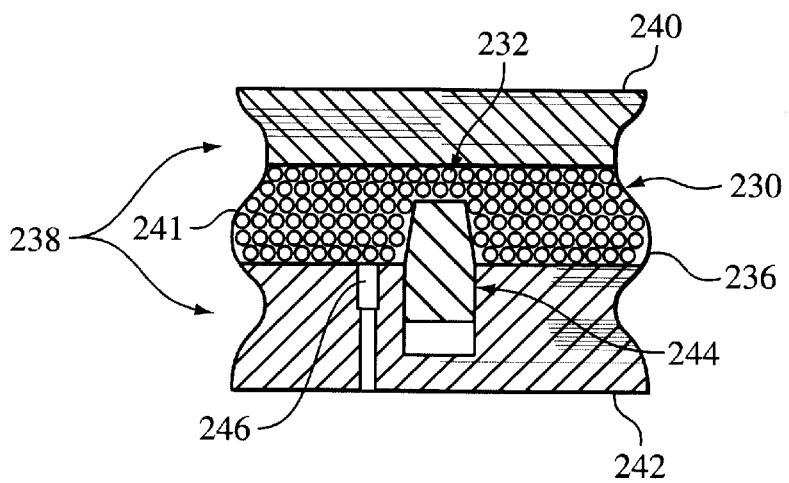
FIG. 8 is first view of an exemplary embodiment of a manufacturing process for making the cover of FIG. 7.
Figure 9:
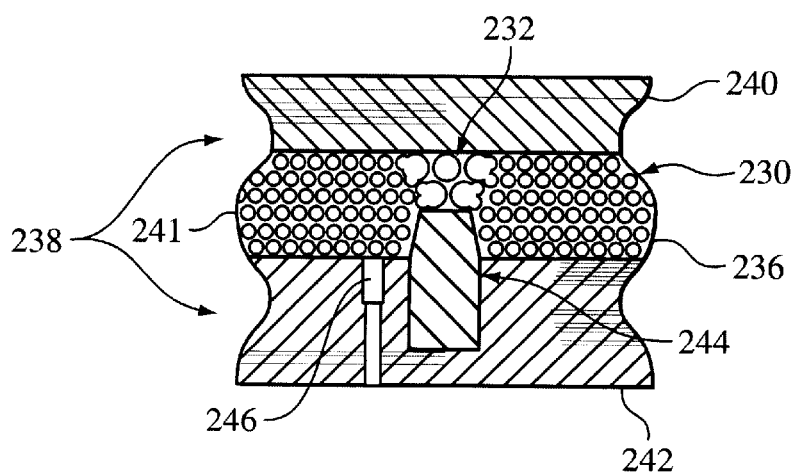
FIG. 9 is second view of the manufacturing process of FIG. 8.

Referring now to FIGS. 8 and 9, an exemplary injection molding manufacturing process for making the foamed polymeric cover 220 of FIG. 7 is provided. The cover 220 is preferably formed by injection molding molten polymeric material into a mold 238. The mold 238 comprises a first portion 240 and a second portion 242 defining a cavity 241 therebetween. The cavity 241 defines the shape of the cover 220. Here, the first portion 240 forms the outside or show side of the cover 220, and the second portion 242 forms the inside or non-show side of the cover.

The second portion 242 is configured to provide the foamed polymeric cover 220 with the weakened region 226 (e.g., thinned portion 228) and with the cells 232. More specifically, the second portion 242 comprises a movable blade 244 to form the thinned portion 228. The movable blade 244 is shown in a first or starting position in FIG. 8, and in a second or ending position in FIG. 9.

During manufacture, as discussed above a liquid blowing agent is admixed with a molten polymeric stream. Next, the mixture is injected into mold 238 while movable blade 244 is in the first position (FIG. 8) and is subjected to a decrease in pressure to convert the liquid blowing agent to a gas. The gas expands to form the cells 232 and 236. After a predetermined event that is discussed in more detail below, the movable blade 244 is moved to its second position (FIG. 9). The movement of the movable blade 244 from the first to the second position allows the cells 232 in weakened region 226 to expand to a larger size than the cells 236 in the remaining regions of the cover. This allows the first cells 232 to result in a reduction of the density of the cover 220 at the weakened region 226 of about 15% to about 30% as compared to the solid polymeric cover 20. Further, this allows for the second cells 236 to result in a reduction of the density of the cover 220 at the remaining regions of at least about 2% as compared to the solid polymeric cover 20, with up to about 15% contemplated.

As discussed above, the movable blade 244 moves from the first position to the second position after the predetermined event. For example, the movable blade 244 moves a predetermined period of time after the molten stream is injected into mold 238.

Alternately, the mold 238 can further include a sensor 246 configured to measure the internal gas pressure of the cells 232 at the weakened region 226. For example, sensor 246 can measure the pressure and or the temperature at the weakened region 226. Thus, the sensor 246 provides information related to the internal gas pressure of the cells 232. The blade 244 is configured to move from the first position to the second position when the sensor 246 detects a selected condition of the cells 232. The density of the cover in the weakened region 226 is precisely controlled by relying on the internal gas pressure of the cells.232 detected by the sensor 246 to move the blade to its second position (FIG. 9). Thus, the sensor 246 enables the movement of the moveable blade 244 to provide the weakened region 226 with cells 232 having a predictable and relatively consistent density.

This manufacturing process provides the flexibility of creating tailor-made weakened region 226 or regions in the cover without affecting the surface appearance and part performance for the rest of the cover 220. The lower density cells 232 at the weakened region 226 as compared to the rest of the sheet 230 provides the weakened region with a desired opening or tear strength, while reducing the overall material usage of the cover 220.

In an alternate embodiment, the first and second portions (240 and 242) are configured to provide the cover 220 with a skin 234 by removing heat from the portion of the sheet 230 in contact with the mold 238. In this embodiment, the mold 238 is cooled to form the skin 234 after the molten stream is injected into the mold 238.

The first portion 240 is also configured to provide the skin 234 with the desired texture and/or surface features. Namely, the skin 234 provides an aesthetically desirable outside surface 221 (e.g., the vehicle facing or show surface) to the cover 220.

Figure 10:
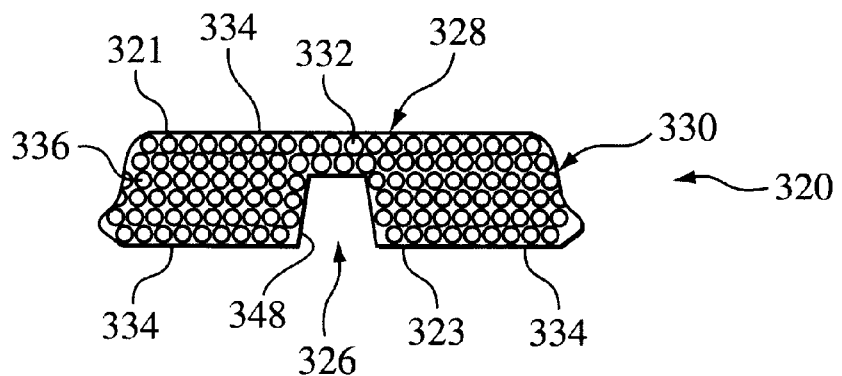
FIG. 10 is a sectional view of another alternate exemplary embodiment of a cover having a weakened region.

Referring now to FIG. 10, an alternate exemplary embodiment of a foamed polymeric cover 320 comprising a polymeric sheet 330 and a weakened region 326 is illustrated.

The sheet comprises a first plurality of cells or hollows 332, a skin 334, a second plurality of cells or hollows 336, and a region 348 (described in detail below). The first cells 332 are disposed in the sheet 330 in the weakened region 326, while the second cells 336 are disposed in the remaining regions of the sheet as described above with respect to FIG. 5. In this embodiment the skin 334 formed on the outside surface 321 and a portion of the inside surface 323 of the sheet 330 has a first thickness. However, the skin in the region 348, which is defined on a portion of the inside surface at the weakened region 326, has a second smaller thickness.

In this embodiment, the skin in the region 348 is thinner that the skin in the remaining portions of the cover. Thus, the cells 332 at the region 348 can expand to a greater degree than the cells 336 in the areas having the thicker skin.

By way of example, the skin 334 in the region 348 has a thickness that is about 5% to 10% smaller than the skin in the remaining regions of the cover. Accordingly, the cells 332 are larger than cells 336 in the remaining regions of the cover 320 by about 5% to 10%. This provides the weakened region 326 with a reduction in density of about 20% as compared to a solid cover 20. The cells 336 result in a reduction of the density of the overall cover 320 of between 2%–15% as compared to a solid cover.

Figure 11:
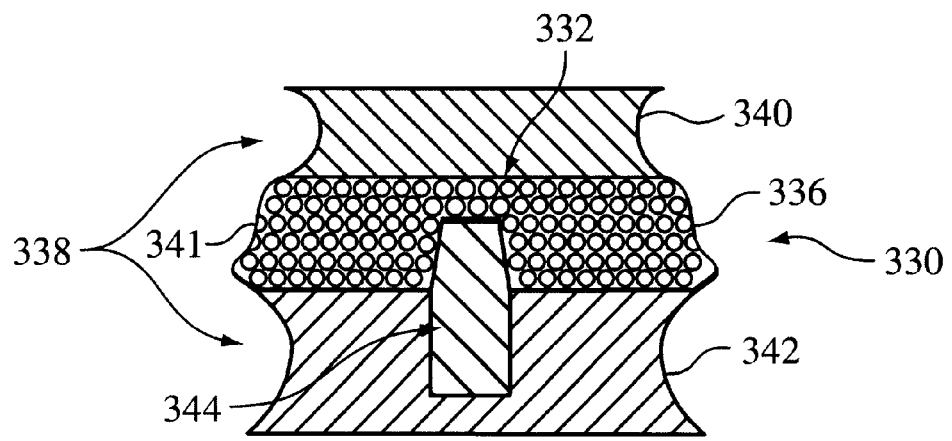
FIG. 11 is schematic view of an exemplary embodiment of a manufacturing process for making the cover of FIG. 10.

Referring now to FIG. 11, an exemplary manufacturing process for making the cover 320 of FIG. 10 is provided. The process is substantially identical to the process described above with respect to FIG. 6. However, in this embodiment the blade 344 mitigates the cooling effects to minimize the thickness of the skin 334 in region 348. The blade 344 is, for example, thermally nonconductive to insulate the region 348 from the cooling effects of the mold 338, and thus to minimize the formation of the skin 334 in the region. Alternately or in combination with the insulating effects, the blade 344 can provide heat to the region 348 to minimize the formation of the skin 334 in the region 348. The design of the blade 344 minimizes the formation of the skin 334 in the region in the region 348.

It should be recognized that the blade 344 configured to minimize the formation of the skin 334 in the region 348 is described separately from the movable blade 244 for purposes of clarity only. Of course, the use of a moving blade that minimizes the formation of the skin in the region is contemplated.

The foamed or cellular cover is described herein by way of example only as having a single layer (e.g., a single shot cover). Of course, the foamed or cellular cover can be formed from multiple layers where the multiple layers have the same or different compositions. For example, it is contemplated for the foamed or cellular cover to be formed with a second layer during a co-molding or two-shot molding process. During this process, the foamed or cellular cover can be used as the exterior layer (e.g., the show surface) or can be covered by a second layer.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cover for an air bag module, comprising:
   a polymeric sheet having a first surface and a second surface, said polymeric sheet including a plurality of cells formed therein, and a skin being formed on at least said first surface; and
   one or more thinned portions being formed in said second surface, said one or more thinned portions defining a weakened region of said cover, wherein said plurality of cells comprises a first plurality of cells and a second plurality of cells, said first plurality of cells being defined at said one or more thinned portions and said second plurality of cells being defined in remaining portions of said polymeric sheet, said first plurality of cells reducing a density of said polymeric sheet more than said second plurality of cells.

2. The cover of claim 1, further comprising a second skin formed on said second surface, a region of said second skin being formed at said one or more thinned portions, said region having a skin thickness that is smaller than a thickness of said second skin that is not at said region.

3. A cover for an airbag module, comprising:
   a foamed polymeric sheet having a show surface and a non-show surface, and a first skin being formed on at least said show surface; and
   a weakened region being formed by one or more thinned portions defined in said non-show surface,
   wherein said foamed polymeric sheet comprises a first zone of cells defined at said weakened region, and a second zone of cells defined in non-weakened regions of said cover, wherein said first zone of cells reduces the density of said weakened region more than said second zone of cells reduces the density of said non-weakened regions.

4. The cover of claim 3, further comprising a second skin formed on said non-show surface, a region of said second skin being formed at said one or more thinned portions, said region having a skin thickness that is smaller than a thickness of said second skin that is not at said region.

5. The cover of claim 3, wherein said foamed polymeric sheet has a density of at least 2% less than a solid cover having similar dimensions and formed from the same polymer.

6. The cover of claim 3, further comprising a second skin being formed on said non-show surface, a first portion of said second skin being formed at said weakened region, a second portion of said second skin being formed on said second surface in non-weakened regions of said foamed polymeric sheet, said first portion being thinner than said second portion.

7. The cover of claim 3, wherein said first zone of cells reduces the density of said weakened region by at least 15%, while said second zone of cells reduces the density of said non-weakened regions by at least 2%.

8. The cover of claim 7, further comprising a second skin formed on said non-show surface, a first portion of said second skin being disposed at said weakened region and a second portion of said second skin being disposed at said non-weakened regions, said first portion being tinner than said second portion.

9. An air bag module, comprising:
   a housing being positionable in a cavity defined in the interior of a vehicle;
   an inflatable cushion;
   an inflator in fluid communication with said inflatable cushion; and
   a cover comprising a foamed polymeric member having a show surface, a non-show surface, and a weakened region, said weakened region being defined by one or more thinned portions, said cover being configured such that said non-show surface covers said housing proximate said inflatable cushion whereby inflation of said inflatable cushion by said inflator causes said inflatable cushion to expand into said cover, and thus to apply a force on said cover to tear or open said cover along said weakened region thereby providing an outlet for said inflatable cushion through said cover into said vehicle,
   wherein said plurality of cells further comprises a first zone of cells defined at said weakened region, and a second zone of cells defined in remaining regions of said foamed polymeric member, wherein said first zone of cells reduces the density of said weakened region more than said second zone of cells reduces the density of said remaining region.

10. The air bag module of claim 9, wherein said foamed polymeric member comprises a plurality of cells configured to reduce the density of said cover by at least 2% as compared to a solid cover having similar dimensions and formed from the same polymer.

11. The air bag module as in claim 9, wherein said one or more thinned portions are defined in said non-show surface, said show surface, or a combination of said show and non-show surfaces.

12. The air bag module of claim 9, further comprising a skin formed on said show surface.

13. The air bag module of claim 9, further comprising a second skin formed on said non-show surface.

14. The air bag module of claim 13, wherein a first portion of said second skin is disposed at said weakened region and a second portion of said second skin is disposed at non-weakened regions of said foamed polymeric member, said first portion being thinner than said second portion.

15. The air bag module of claim 9, wherein said first zone of cells reduces the density of said weakened region by at least 15%, while said second zone of cells reduces the density of said remaining regions by at least 2%.

16. A method of making a cover for an air bag module, comprising:
   mixing a blowing agent and a molten polymer under a first condition, said first condition being sufficient to prevent said blowing agent from forming bubbles in said polymer;
   changing said first condition to a second condition, said second condition being sufficient to cause said blowing agent to form bubbles in said molten polymer;
   molding said molten polymer containing said bubbles into a desired shape in a mold, said desired shape comprising a first polymer sheet having a plurality of first cells being defined therein by said bubbles and a thinned portion being defined in a first surface of said first polymer sheet, said mold includes a blade positioned and configured to define said thinned portion; and
   cooling said mold to form a first skin on said first surface of said first polymer sheet, said first skin including a first portion defined at said thinned portion and a second portion defined in non-thinned portions of said first polymer sheet, said first portion being thinner than said second portion.

17. The method of claim 16, wherein said blade is configured to mitigate said cooling of said mold at said thinned portion to cause said first portion to be thinner than said second portion.

18. The method of claim 16, wherein said first portion being thinner than said second portion causes said first cells expand to second cells at said thinned portion, said second cells reducing the density of said first polymer sheet more than said first cells reduce the density of said first polymer sheet.

19. The method of claim 18, further comprising:
   cooling said mold to form a second skin on a second surface of said first polymer sheet.

20. The method of claim 19, wherein said desired shape further comprises a second polymer sheet formed on said first surface or said second surface of said first polymer sheet, said first and second polymer sheets having the same or different polymer compositions.

21. The method of claim 16, wherein changing said first condition to said second condition comprises a rapid change in temperature, a rapid change in pressure, and/or combinations thereof.

22. The method of claim 16, wherein, said blowing agent decreases a viscosity level of said molten polymer such that restriction in the flow of said molten polymer in said mold at said blade is reduced to avoid stress.

23. A method of making a cover for an air bag module, comprising:
   mixing a blowing agent and a molten polymer under a first condition, said first condition being sufficient to prevent said blowing agent from forming bubbles in said polymer;
   changing said first condition to a second condition, said second condition being sufficient to cause said blowing agent to form bubbles in said molten polymer;
   molding said molten polymer containing said bubbles into a desired shape in a mold, said desired shape comprising a first polymer sheet having a plurality of first cells being defined therein by said bubbles and a thinned portion being defined in a first surface of said first polymer sheet, said mold includes a blade positioned and confirmed to define said thinned portion; and expanding said first cells to second cells at said thinned portion by moving said blade from a first position to a second position, said blade being farther from said second surface in said second position than in said first position.

24. The method of claim 23, wherein said second cells reduce the density of said thinned portion by at least 15%, while said first cells reduce the density by at least 2%.

25. The method of claim 23, further comprising:

sensing a state of said first cells at said thinned portion; and moving said blade to said second position based upon said state reaching a set point.

26. The method of claim 25, wherein said state includes at least one of pressure, time, and temperature.

27. A method of controlling the density of a region of a foamed polymer, comprising:

mixing a blowing agent and a molten polymer under a first condition, said first condition being sufficient to prevent said blowing agent from forming bubbles in said polymer;

changing said first condition to a second condition, said second condition being sufficient to cause said blowing agent to form bubbles in said molten polymer;

molding said molten polymer containing said bubbles into a desired shape in a mold, said desired shape including a plurality of first cells being defined within said desired shape by said bubbles; and moving a portion of said mold disposed at said region from a first position to a second position, movement of said portion of said mold causing said first cells in said region to change to second cells without changing said first cells in remaining regions of said foamed polymer, said foamed polymer having a first density at said remaining regions caused by said first cells and a second density at said region caused by said second cells.

28. The method of claim 27, comprising:

sensing a state of said first cells at said region; and moving said portion of said mold to said second position based upon said state reaching a set point.

29. The method of claim 28, wherein said state includes at least one of pressure, time, and temperature.

30. The method of claim 27, wherein said first density is more dense than said second density.

* * * * *